No. 816,931. PATENTED APR. 3, 1906.
A. MAGNUSON.
SYSTEM OF MOTOR CONTROL.
APPLICATION FILED NOV. 16, 1905.
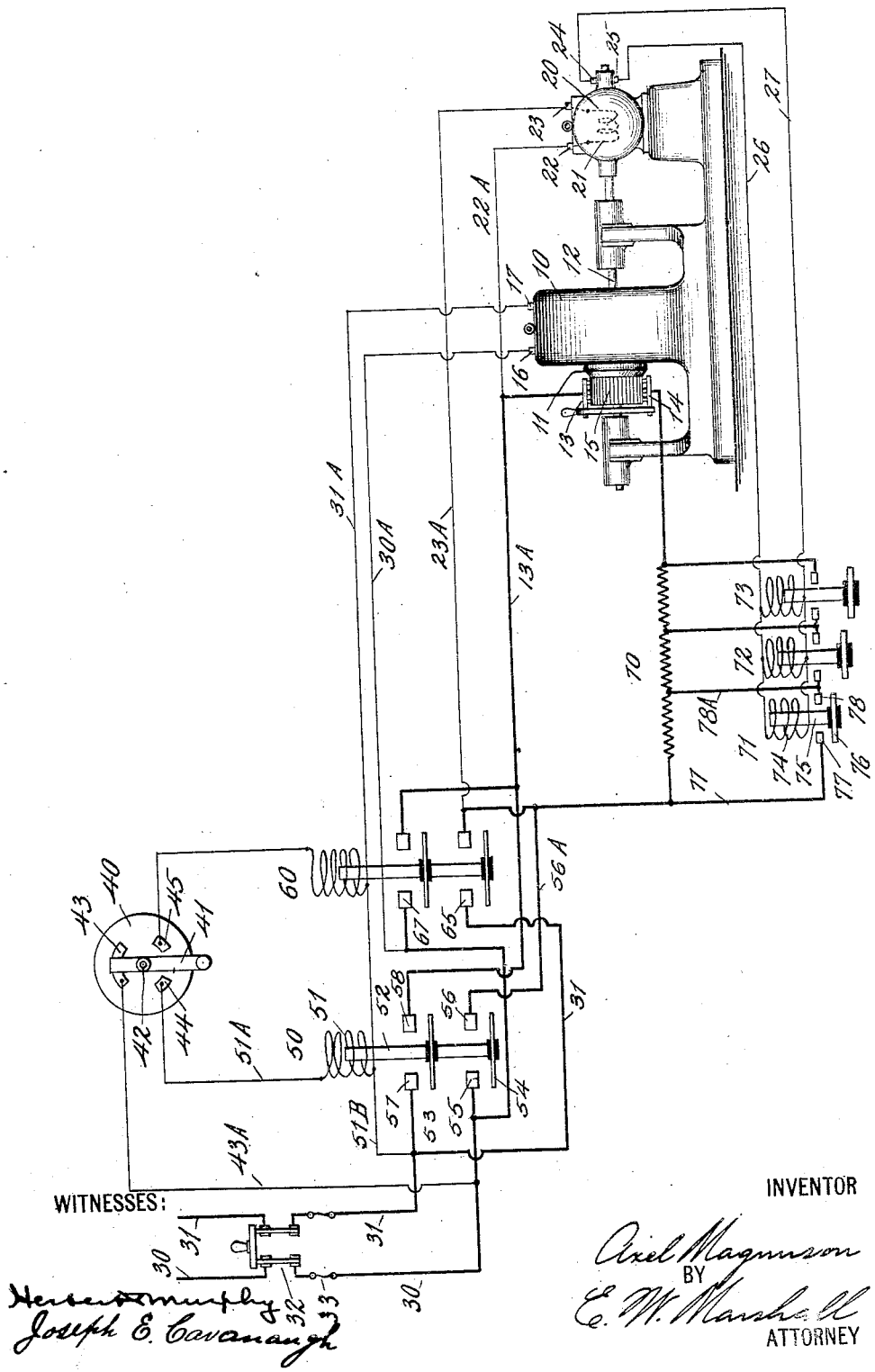
WITNESSES:
INVENTOR
Axel Magnuson
BY
E. W. Marshall
ATTORNEY

UNITED STATES PATENT OFFICE.

AXEL MAGNUSON, OF NEW YORK, N. Y., ASSIGNOR TO OTIS ELEVATOR COMPANY, OF JERSEY CITY, NEW JERSEY, A CORPORATION OF NEW JERSEY.

SYSTEM OF MOTOR CONTROL.

No. 816,931.

Specification of Letters Patent.

Patented April 3, 1906.

Application filed November 16, 1905. Serial No. 287,555.

*To all whom it may concern:*

Be it known that I, AXEL MAGNUSON, a citizen of the United States, and a resident of New York city, in the county of New York and State of New York, have invented certain new and useful Improvements in Systems of Motor Control, of which the following is a specification.

My invention relates to a system of motor control; and it consists of a novel arrangement of various apparatus and circuits whereby an electric motor may be started, stopped, and otherwise controlled at will.

Although my system is applicable to other types of electric motors, it may be used to great advantage in conjunction with such motors as are operated by alternating currents.

I have made application for Letters Patent, Serial No. 241,592, filed January 18, 1905, for a system of motor control which embodies the broad idea of the present invention, and the present invention is of certain improvements and developments of the invention dsclosed in said prior application.

The drawing shows an electric motor in side elevation, together with certain connected apparatus and electrical circuits.

10 designates an electric motor, 11 its armature, and 12 its shaft. 13 and 14 are the brushes of this motor, which bear upon its commutator 15. 16 and 17 are the terminals of a shunt field-winding for this motor.

20 is a generator directly connected to motor-shaft 12. 21 is a shunt field-winding for this generator, and 22 and 23 are terminals for the shunt field-winding.

24 and 25 designate brushes bearing upon the commutator of generator 20, and 26 and 27 are conductors or leads connected to the brushes 24 and 25, respectively.

30 and 31 designate the mains from a suitable source of current-supply. These pass through main-line switch 32, fuses 33, and to certain other parts of the apparatus, which will be pointed out fully hereinafter.

40 designates a manually-operated circuit-closer which comprises a switch-arm 41, pivoted at 42 and adapted to rest upon a stationary contact 43. When this switch-arm is moved in one direction, it will connect stationary contact 43 with another stationary contact 44. When it is moved in the other direction, it will connect stationary contact 43 with stationary contact 45.

50 and 60 designate electromagnets, which are arranged to operate a reversing-switch, which I will now describe. Magnet 50 has a winding 51, within which is a core 52. Contact-plates 53 and 54 are connected to, but insulated from, the core 52. Above these contact-plates 53 and 54 are four stationary contacts 55, 56, 57, and 58. Magnet 60 comprises similar parts.

70 is a resistance in series with the armature 11 of motor 10.

71, 72, and 73 are three electromagnets, which form an electroresponsive device, the purpose of which is to automatically cut resistance 70 out of the motor-circuit. Magnet 71 comprises a coil 74 and a core 75. A contact-plate 76 is connected to, but insulated from, the core 75. Above contact-plate 76 are two stationary contacts 77 and 78. Magnets 72 and 73 comprise similar parts.

I will now point out the various electrical circuits shown in this drawing and describe the operation of this invention. The main-line circuits and the motor-armature circuits are designated by heavy lines, while the operating-circuits and motor-field and generator circuits are designated by light lines. Main-line conductor 31 is connected to stationary contacts 57 and 65 in the reversing-switch. The main-line conductor 30 is connected to stationary contacts 55 and 67 in the reversing-switch. The terminals 16 and 17 of shunt-field of motor 10 are connected, respectively, to the main-line conductors 30 and 31 by conductors $30^A$ and $31^A$. If an operator turns the handle 41 of the manually-operated circuit-closer 40 to the left, so that it closes the circuit between stationary contacts 43 and 44, a circuit will be closed thereby from main-line conductor 30 through conductor $43^A$, circuit-closer 40, conductor $51^A$, through magnet-winding 51, and to main-line conductor 31 through a conductor $51^B$. The winding 51 will therefore be connected across the mains from the source of current-supply and will be energized thereby. It will then raise core 52 until contact-plates 53 and 54 are raised against the contacts 57 and 58 and 55 and 56, respectively. A circuit will be closed thereby from main line 30, contacts 55 and 56, conductor 56$^A$, resistance 70 to brush 14, through motor-armature 11, out at brush 13, thence by conductor 13$^A$ to contacts 58 and 57, and thence to main-line conductor 31. As the field-winding of motor 10 is connected across the line and as the circuit is now completed through resistance 70 and armature 11 of motor 10, the motor-armature will begin to rotate in one direction. It may be seen that at the same time a circuit is closed through the motor-armature another circuit is closed from main line 30 through contacts 55 and 56, conductors 56$^A$ and 23$^A$ to terminal 23 of the generator-field 21, through the generator-field out at terminal 22, and through conductors 22$^A$ and 13$^A$ to contacts 58 and 57, and thence to main-line conductor 31. The magnetic field of generator 20 will thus be quickly energized and the generator will begin to generate a voltage which will be proportional in strength to the speed of the motor 10. The voltage thus generated is led through conductors 26 and 27 to the windings of the magnets 71, 72, and 73, which, as shown in the drawing, are connected in parallel, and are thus connected across the brushes 24 and 25 of generator 20. As the speed of motor 10 increases, and consequently the current generated by generator 20 increases, these magnets 71, 72, and 73 will be energized thereby. The strength of these magnets will therefore gradually increase as the speed of motor 10 increases. The magnets may be arranged to lift their cores step by step as the strength of this current increases. This step-by-step effect may be obtained in various ways—as, for example, by setting the cores at different positions within the windings of the magnets, as is shown in the drawing. As the generated current increases the magnet 71 will reach a sufficient strength to attract and lift its core 75, when its contact-plate 76 will be brought up against stationary contacts 77 and 78. These stationary contacts are connected by contacts 77$^A$ and 78$^A$ to a portion of resistance 70. When contact-plate 76 is raised up against stationary contacts 77 and 78, the portion of resistance included between resistance 77$^A$ and 78$^A$ will be short-circuited thereby. This in turn will allow more current to pass through the motor-armature and its speed will be accelerated thereby. The effect of this will be to increase the strength of current in magnets 71, 72, and 73, and as soon as the current strength reaches another predetermined amount magnet 72 will raise its core and contact-plate against another pair of stationary contacts, and will thus short-circuit another portion of resistance 70. This operation will be repeated until magnet 73 raises its core and short-circuits the remaining portion of resistance 70. The operation above described will be entirely automatic and the resistance will be cut out of the motor-armature circuit proportionately to the acceleration of the motor-armature—that is, it will be cut out quickly when the load upon motor 10 is light and its acceleration is rapid, or it will cut out more slowly when the load upon the motor 10 is heavier and its acceleration therefore is slower. When it is desired to stop the motor, the handle 41 of manually-operated circuit-closer 40 may be brought back to its central position, when magnet 51 will be deënergized and will allow its core and its connected contact-plates to drop back away from the stationary contacts. The motor-circuit will thus be broken, the motor will come to rest, and the movable parts of magnets 71, 72, and 73 will assume their initial position. If the operator had moved handle 41 to the right, so that it closed a circuit upon stationary contacts 43 and 45, the operation would have been similar; but in this case magnet 60 would have been operated to close circuits between its stationary contacts and the current would have been supplied to the motor-armature 11 and to the generator shunt-field 21 in the opposite direction. The motor would therefore rotate in the opposite direction. It may be seen that although the armature of generator 20 will also rotate in the opposite direction its shunt-field 21 will have current supplied to it in the opposite direction, so that the current flowing from its brushes 24 and 25 will always be in the same direction regardless of its direction of rotation.

It is believed that this system as described in combination with a starting device for electric motors has many advantageous uses and that it is applicable to many other electrical controlling devices than that herein shown and described.

What I claim is—

1. An electric motor, a generator connected to run with the motor, a field for the generator, and a source of current-supply connected to the motor and to the field of the generator, and motor-controlling means separate from the field of the motor and operated by current from said generator.

2. An electric motor, a generator connected to run with the motor, a field for the generator, a source of current-supply, means for quickly exciting the generator-field when the current-supply is closed to the motor, and motor-controlling apparatus separate from the field of the motor and operated by current from the generator.

3. An electric motor, a starting-switch therefor, a generator connected to run with the motor, a field for the generator, and a source of current-supply connected to the motor and to the field of the generator through the starting-switch, and a motor-controlling device separate from the field of the motor and operated by current from said generator.

4. An electric motor, a reversing-switch therefor, a generator connected to run with the motor, a field for the generator, a source of current-supply, contacts in said reversing-switch arranged to close a circuit to the motor and to the field of the generator, and means connected to the generator but separate from the field of the motor, for controlling the acceleration of the motor.

5. An electric motor, an electrically-actuated reversing-switch therefor, a generator connected to run with the motor, a field for the generator, a source of current-supply, contacts in said reversing-switch arranged to close a circuit to the motor and to the field of the generator, said generator arranged to control the acceleration of the motor, and a manually-operated circuit-closer.

6. An electric motor, having an armature and a field, a source of current-supply connected to the motor-field, a reversing-switch for the motor, a generator connected to run with the motor, a field for the generator, contacts in the reversing-switch to effect a reversal of the generator-field connections whenever the circuit through the motor-armature is reversed, and means operated by current from the generator to control the acceleration of the motor.

7. An electric motor, a generator connected to run with the motor, a field for the generator, a source of current-supply connected to the motor and to the field of the generator, an electroresponsive device arranged to control the acceleration of the motor, said electroresponsive device being actuated by the current of the generator.

8. An electric motor, a generator connected to run with the motor, a field for the generator, a source of current-supply connected to the motor-field and to the field of the generator, an electroresponsive device arranged to control the acceleration of the motor, said electroresponsive device being actuated, step by step, by the current of the generator.

9. An electric motor, a generator connected to run with the motor and arranged to generate a voltage proportional in strength to the speed of the motor, a field for the generator and a source of current-supply connected to the motor and to the field of the generator, and a device separate from the field of the motor and dependent upon the variable voltage of the generator to control the movement of the motor.

10. An electric motor, an opposition element in the motor-circuit, a generator connected to run with the motor, a field for the generator, a source of current-supply connected to the motor and to the field of the generator, an electroresponsive device arranged to control the acceleration of the motor, said electroresponsive device being actuated by the current of the generator.

11. An electric motor having an armature and a field, an opposition element in the motor-armature circuit, a generator connected to run with the motor, a field for the generator, a source of current-supply connected to the motor-field and to the field of the generator, an electroresponsive device arranged to cut the opposition element out of the motor-armature circuit, said electroresponsive device being actuated step by step by the current of the generator.

12. An electric motor having an armature and a field, a resistance in the motor-armature circuit, a generator connected to run with the motor, a field for the generator, a source of current-supply connected to the motor-field and to the field of the generator, a plurality of electromagnets arranged to cut the resistance out of the motor-armature circuit, said electromagnets being actuated by the current of the generator.

13. An electric motor, having an armature and a field, a resistance in the motor-armature circuit, a generator connected with the motor and arranged to generate a voltage proportional in strength to the speed of the motor, a field for the generator, a source of current-supply connected to the motor-field and to the field of the generator, a plurality of electromagnets arranged to short-circuit the resistance in the armature-circuit, said electromagnets being actuated one by one by the variable voltage of the generator.

14. An electric motor having an armature and a field, a resistance in the motor-armature circuit, an electrically-actuated reversing-switch for the motor, a generator connected with the motor and arranged to generate a voltage proportional in strength to the speed of the motor, a field for the generator, a source of current-supply connected to the motor-field and to the field of the generator, a plurality of electromagnets arranged to short-circuit the resistance in the armature-circuit, said electromagnets being actuated one by one by the variable voltage of the generator, and a manually-operated circuit-closer for the reversing-switch.

In testimony whereof I have signed my name to this specification in the presence of two subscribing witnesses.

AXEL MAGNUSON.

Witnesses:
JOSEPH E. CAVANAUGH,
ERNEST W. MARSHALL.